(12) United States Patent
Egri, II

(10) Patent No.: US 8,973,330 B2
(45) Date of Patent: Mar. 10, 2015

(54) EXPANSION BRACKET, SYSTEM, AND METHOD

(71) Applicant: John David Egri, II, Fort Myers, FL (US)

(72) Inventor: John David Egri, II, Fort Myers, FL (US)

( * ) Notice: Subject to any disclaimer, the term of this patent is extended or adjusted under 35 U.S.C. 154(b) by 0 days.

(21) Appl. No.: 14/469,324

(22) Filed: Aug. 26, 2014

(65) Prior Publication Data

US 2014/0373468 A1 Dec. 25, 2014

Related U.S. Application Data

(63) Continuation of application No. 13/740,870, filed on Jan. 14, 2013, now abandoned.

(51) Int. Cl.
| | | |
|---|---|---|
| *E04B 1/343* | (2006.01) | |
| *E04B 1/94* | (2006.01) | |
| *E04F 13/08* | (2006.01) | |
| *E04B 1/18* | (2006.01) | |
| *E04B 1/28* | (2006.01) | |

(52) U.S. Cl.
CPC ............ *E04B 1/941* (2013.01); *E04F 13/0805* (2013.01); *E04B 1/185* (2013.01); *E04B 1/28* (2013.01); *E04B 1/94* (2013.01); *E04B 1/945* (2013.01)
USPC ............ 52/573.1; 52/167.1; 52/713; 52/712; 52/489.1; 52/506.05; 248/231.81; 248/300; 403/403

(58) Field of Classification Search
CPC ............ E04B 1/2608; E04B 1/38; E04B 1/40; E04B 7/045; E04B 7/04; E04B 2001/2415; E04B 2001/2439
USPC ............ 52/73, 36.4, 715, 707, 289, 702, 710, 52/506.06, 712, 713, 714, 551, 506.05, 52/489.1, 489.2, 605, 573.1; 248/216.1, 248/231.91, 268, 300; 403/403
See application file for complete search history.

(56) References Cited

U.S. PATENT DOCUMENTS

| | | | | |
|---|---|---|---|---|
| 5,720,571 | A | * | 2/1998 | Frobosilo et al. ............. 403/403 |
| 5,846,018 | A | * | 12/1998 | Frobosilo et al. ............. 403/403 |
| 6,213,679 | B1 | * | 4/2001 | Frobosilo et al. ............. 403/403 |
| 7,918,054 | B2 | * | 4/2011 | Grafton et al. ................. 52/92.3 |

* cited by examiner

*Primary Examiner* — Chi Q Nguyen
(74) *Attorney, Agent, or Firm* — George F. Wallace

(57) ABSTRACT

An expansion bracket absorbs movement of a wall stud to prevent damage to a wall covering attached to the wall stud. The expansion bracket can include a main body having a main body flange, formed of a deformable material, and having a wall stud attachment end configured to attach to the wall stud via a wall stud attachment element. The main body can also have a furring attachment element configured to attach a furring to the main body. When the main body is attached to the wall stud and the furring, and the wall covering is attached to the furring via a wall covering attachment element, the main body flange is configured to absorb, via deformation, at least a portion of the movement of the wall stud due to heat-based expansion of the wall stud.

28 Claims, 6 Drawing Sheets

EXPANSION BRACKET, SYSTEM, AND METHOD

RELATED DOCUMENTS

This document is related to, incorporates by reference in its entirety, and claims the priority benefit of U.S. patent application Ser. No. 13/740,870, entitled "Expansion Bracket," and filed on Jan. 14, 2013 by John David Egri, II.

FIELD OF THE INVENTION

The present invention relates to building material attachment brackets.

BACKGROUND OF THE INVENTION

Building material attachment brackets are used in the building construction industry to attach a plurality of building material components to one another to form and assemble structures, such as dwellings and buildings.

SUMMARY OF THE INVENTION

It is, therefore, an object of the present invention to provide an expansion bracket that can absorb movement of a wall stud to prevent damage to a wall covering attached to the wall stud. It is another object of the present invention to provide a method of installing an expansion bracket that can absorb movement of a wall stud to prevent damage to a wall covering attached to the wall stud.

An exemplary environment of the present invention can include, but is not limited to, a wall, a floor, a subfloor or a ceiling. For convenience purposes, use of the term "wall" throughout this document is expressly intended to include a floor, a subfloor, and a ceiling.

The present invention can be embodied in an expansion bracket having a main body.

In an exemplary aspect, the main body can include a main body flange, which can be formed of a deformable material, and can have a wall stud attachment end that can be configured to attach to a wall stud via a wall stud attachment element. The main body can further include a furring attachment element that can be configured to attach a furring to the main body.

In a further exemplary aspect, if the main body is attached to the wall stud and the furring, and the wall covering is attached to the furring via a wall covering attachment element, the main body flange can absorb, via deformation, at least a portion of the movement of the wall stud due to heat-based expansion of the wall stud.

The present invention can be formed, in whole or in part, from one or more of the following materials: a metal, a plastic, a polymer, wood, a naturally-occurring material, a man-made material, and/or any other material that is functionally compatible with the present invention as described and/or claimed. Exemplary metals can include, but are not limited to, steel, iron, copper, chrome and titanium.

Any combination of the following additional and/or optional exemplary aspects of the present invention can be additionally provided:

the main body can include an expansion slot through the main body, and at least a portion of the expansion slot can be adjacent to the main body flange;
at least a portion of the main body flange can have at least one of an arc shape, a linear shape, and a spiral shape;
the furring attachment element can include a plurality of tabs configured to attach the furring to the main body;
the furring attachment element can be configured to attach to the main body via a main body attachment element, and the furring attachment element can be rotatable around at least one axis defined at least in part by the main body attachment element, and if the main body is attached to the wall stud and the furring attachment element, and the furring is attached to the furring attachment element and the wall covering, the furring attachment element can be configured to absorb, via rotation around the at least one axis, at least a part of the movement of the wall stud due to the heat-based expansion of the wall stud;
the furring attachment element can include a plurality of tabs that can be configured to attach the furring to the furring attachment element;
the furring attachment element can be configured to attach to the main body via a main body attachment element, and the furring attachment element can have a furring attachment flange, which can be formed of one of the deformable material and another deformable material, and can have a flange attachment end that can be configured to attach to the main body via the main body attachment element, and if the main body is attached to the wall stud and the furring attachment element, and the furring is attached to the furring attachment element and the wall covering, the furring attachment element can be configured to absorb, via deformation, at least a part of the movement of the wall stud due to the heat-based expansion of the wall stud; and
at least a portion of the furring attachment flange can have at least one of an arc shape, a linear shape, and a spiral shape.

An additional exemplary embodiment of the present invention includes a method of installing an expansion bracket, which can then absorb movement of a wall stud to prevent damage to a wall covering attached to the wall stud.

The following are exemplary aspects of such a method:
attaching a main body of the expansion bracket to the wall stud;
attaching a furring to the main body;
attaching the wall covering to the furring; and
the main body can include a main body flange, formed from a deformable material, and having a wall stud attachment end configured to attach the main body to the wall stud via a wall stud attachment element, and a furring attachment element configured to attach the furring to the main body, such that if the main body is attached to the wall stud and the furring, and the wall covering is attached to the furring, the main body flange can be configured to absorb, via deformation, at least a portion of the movement of the wall stud due to heat-based expansion of the wall stud.

Of the following optional exemplary aspects of the present invention, one or more can be combined with a method of the present invention:

the main body can include an expansion slot through the main body, and at least a portion of the expansion slot can be adjacent to the main body flange;
at least a portion of the main body flange can have at least one of an arc shape, a linear shape, and a spiral shape;
the furring attachment element can include a plurality of tabs which can be configured to attach the furring to the main body;
attaching a furring to the main body can include attaching the furring to the main body via a main body attachment element, with the furring attachment element being rotatable around at least one axis defined at least in part by the main body attachment element, and if the main body is attached to the wall stud and the furring attachment element, and the furring is attached to the furring attachment element and the wall covering, the furring attachment element can be configured to absorb, via rotation around the at least one axis, at least a part of the movement of the wall stud due to the heat-based expansion of the wall stud;

the main body can include an expansion slot through the main body, and at least a portion of the expansion slot can be adjacent to the main body flange;

attaching of a furring to the main body can include attaching the furring to the main body via a main body attachment element, with the furring attachment element having a furring attachment flange, formed of one of the deformable material and another deformable material, and having a flange attachment end that can be configured to attach to the main body via the main body attachment element, such that if the main body is attached to the wall stud and the furring attachment element, and the furring is attached to the furring attachment element and the wall covering, the furring attachment element can be configured to absorb, via deformation, at least a part of the movement of the wall stud due to the heat-based expansion of the wall stud; and at least a portion of the furring attachment flange can have at least one of an arc shape, a linear shape, and a spiral shape.

These and other exemplary aspects of the present invention are described herein.

BRIEF DESCRIPTION OF THE DRAWINGS

The present invention is illustrated by way of example, and not in limitation, in the figures of the accompanying drawings.

DETAILED DESCRIPTION OF THE INVENTION

Figure 1:
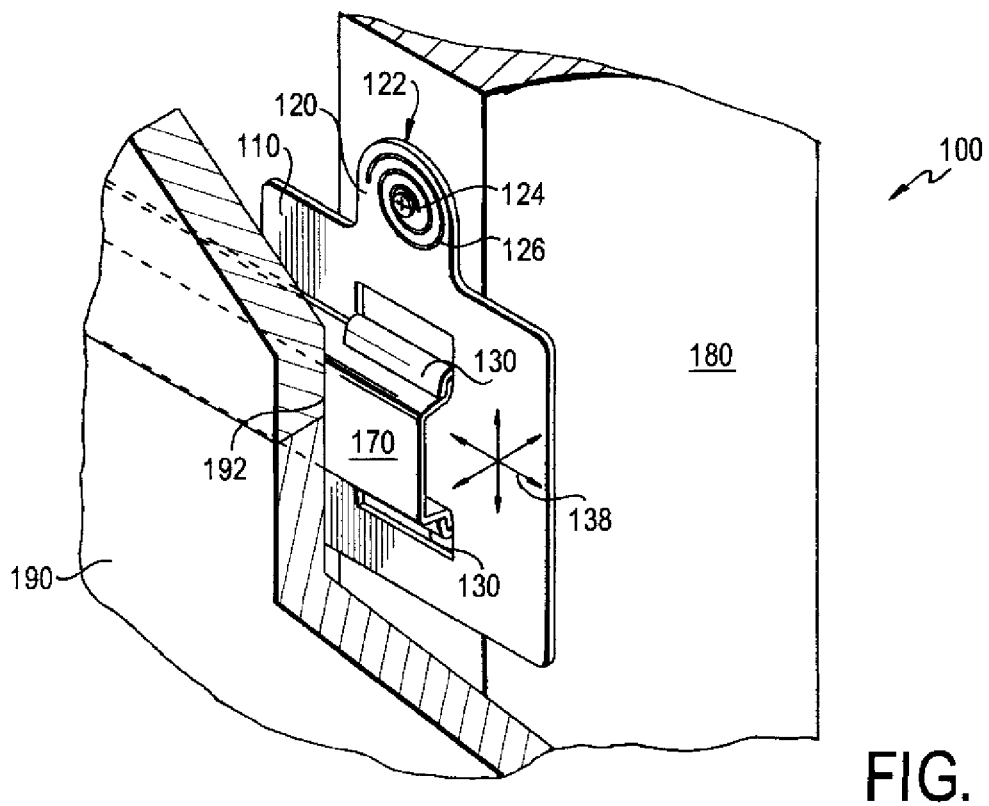
FIG. 1 illustrates an exemplary embodiment of the present invention, in which an expansion bracket includes a main body, a main body flange and a furring attachment element.

The present invention will now be described in more detail by way of example with reference to the embodiments shown in the accompanying figures. It should be kept in mind that the following described aspects and embodiments are only presented by way of example and should not be construed as limiting the inventive concept to any particular physical configuration, material, or order.

Building construction consists of forming or assembling a structure on real property. These structures generally consist of at least one of a wall, a floor, and a ceiling.

A wall is a vertical structure that defines an area; for example, a wall can delineate a building or structure, support its superstructure, separate space inside the building or structure, and act as an acoustic buffer. A wall comprises a plurality of components attached to one another, including, but not limited to structural elements such as studs and joists, insulation, and surface or finish elements, such as drywall and other wall coverings. A wall can be load-bearing, for example, to support a floor, a ceiling, and a roof, or non-load bearing, for example, a partition wall that defines an interior area or a curtain wall that has only decorative qualities.

A floor provides a walking surface and can define a level in a building or structure. A floor can consist of a subfloor and a floor covering. The subfloor can provide the strength and structure of the floor, and can consist of a plurality of components attached to one another, including, but not limited to, structural elements, such as beams and joists, and underlayments, for example, moisture resistant barriers such as AC grade plywood and composite sheeting. Subfloors can also contain additional underlayments to support concrete, hardwood, tile, and any other material contemplated for use as a floor covering.

A ceiling can be an overhead interior surface that covers the upper limit of a room. Generally, a ceiling can be a non-structural underside of a floor; however, a ceiling can have concealing qualities and secondarily provide support to a given structure.

Building construction is subject to a set of rules that specify the minimum acceptable level of safety for a constructed object. These rules can include minimizing the risk and spread of fire and also the minimum qualities of the building materials used. Building materials can be required to possess minimum characteristics and also minimize the risks of fire.

A fire resistance rating of a building material or structure can be defined by the duration for which the material can withstand a fire resistance test. A fire resistance test involves placing a test sample, such as a mock up section of a wall, floor or ceiling, into a high-temperature furnace with one side of the sample exposed to fire for a period of time. The fire resistance rating can be based on a plurality of test specifications, including but not limited to the length of time required for fire to penetrate the sample, the length of time required for the sample to exceed a specified average heat rise above an ambient temperature, and whether a hose-stream test is passed after removal of the test sample from the furnace. The longer the time period associated with failure of the individual components, the higher the fire resistance rating.

Embodiments of the present invention, as illustratively shown in the figures, define a structural element to assist with the minimization of fire risk in a building or structure.

FIG. 1 illustrates one exemplary embodiment of the present invention, in which an expansion bracket 100 can include a main body 110. The expansion bracket 100 can absorb movement of a wall stud 180 to prevent damage to a wall covering 190 attached to the wall stud 180. As further illustrated in FIG. 1, main body 110 can include a main body flange 120 and a furring attachment element 130.

The main body flange 120 can be formed of a deformable material. A deformable material can be one that changes shape or size due to an applied force or a change in temperature. The types of deformation can include, but are not limited to, pulling or tensile deformation, pushing or compressive deformation, shear, bending, torsion or twisting, and strain, which can also be defined as thermally activated mobility of structural defects within the material.

Types of deformable materials can include, but are not limited to, a metal, a plastic, a polymer, wood, a naturally-occurring material, a man-made material, and/or any other material that is functionally compatible with the present invention as described and/or claimed.

The main body flange 120 can include a wall stud attachment end 122, which can be the location at which the main body 110 is attached to the wall stud 180. It should be noted that main body flange 120 is illustratively shown in FIG. 1 as having at least a portion that is arc shaped, but any other functionally compatible shape can be provided. For example, at least a portion of main body flange 120 can alternatively or additionally have a linear shape. It is expressly set forth that all possible shapes of main body flange 120 include at least a portion having an arc or linear shape, which can form any shape, including a spiral shape.

It should also be noted that main body flange 120 is illustratively shown in FIG. 1 as being a lip, but any other functionally compatible structure can be provided. For example, main body flange 120 can be an internal or external ridge or rim, or be a separate plate or ring used to form a lip, ridge or rim on the main body 110.

It should also be noted that in FIG. 1 main body flange 120 is illustratively shown as a single element, however, a plurality of main body flanges 120 can be provided where functionally desired. For example, as illustratively shown in FIGS. 3 and 4, main body flanges 320, 420 can be located at the directional top and bottom of the main body 310, 410. Optional configurations of the main body flange 120 can include, but are not limited to, more than three flanges, which can be located on main body 110.

As further illustrated in FIG. 1, the wall stud attachment end 122 can be configured to attach to wall stud 180, via a wall stud attachment element 124. It should be noted that wall stud attachment element 124 is illustratively shown as a screw; however any functionally compatible attachment element can be provided. For example, wall stud attachment element 124 can have one or more components that attach, or cooperatively attach, the wall stud attachment end 122 to wall stud 180, such as one or more of a screw, a nail, a screw or bolt with an optional complementarily shaped washer and/or nut, a rivet, a nail and a washer, one or more staples, or any other functionally compatible attachment element.

Figure 2:
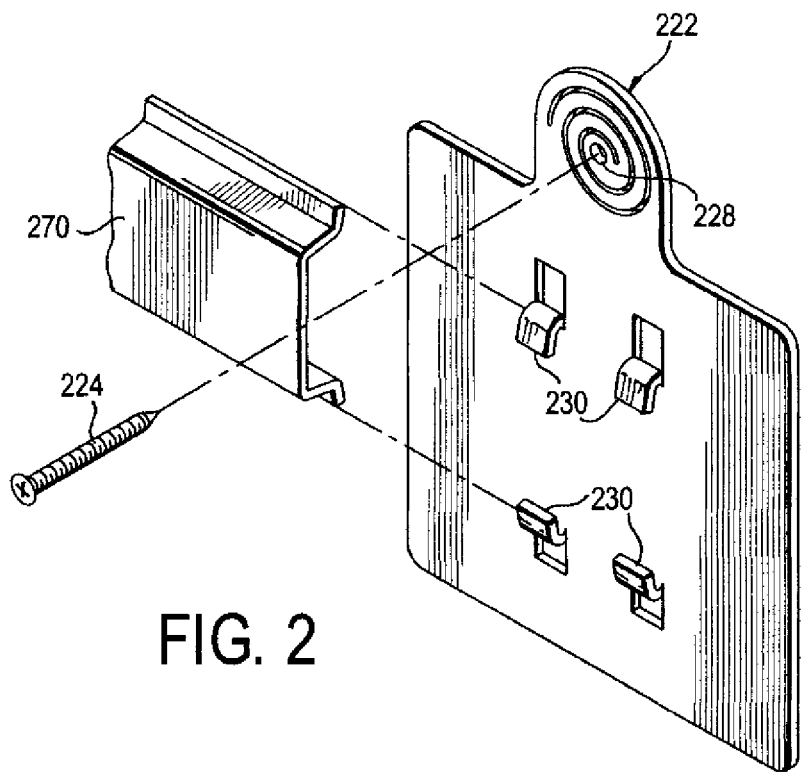
FIG. 2 illustrates an exemplary aspect of the present invention, in which an expansion bracket includes a furring attachment element having a plurality of tabs.

FIG. 2 illustrates an exemplary aspect of wall stud attachment end 222; wall stud attachment element 224 can pass through wall stud attachment end 222 via a guide hole 228. It should be noted that guide hole 228 is illustratively shown in FIG. 2 as being circular and passing through the wall stud attachment end 222, however any structurally compatible guide element can be provided. For example, guide hole 228 can be a demarcated dent or a stamped image not passing through the attachment end 222, or any geometric, symmetric, asymmetric, regular or oversized shape with or without a washer and/or corresponding screw or bolt, passing through the attachment end 222 that corresponds with the dimensions of the stud attachment element 224.

As also illustrated in FIG. 1, wall stud attachment end 122 can include an expansion slot 126. Expansion slot 126 can be configured to pass through the main body 110, and at least a portion of expansion slot 126 can be adjacent to the main body flange 120. It should be noted that expansion slot 126 is illustratively shown in FIG. 1 as having at least a portion that is arced, however, any other functionally compatible shape can be provided. For example, as illustratively shown in FIGS. 3 and 4, expansion slot 326, 426 can have at least a portion that is linear. Additional embodiments of expansion slot 126 can include, but are not limited to, expansion slot 126 having at least a portion that is linear or arced. It is expressly set forth that all possible shapes of expansion slot 126 include at least a portion having an arc or linear shape. It should also be noted that for embodiments with a plurality of wall stud attachment ends, any two wall stud attachment ends can have the same or differently shaped expansion slots.

As further illustrated in FIG. 1, the furring attachment element 130 can be configured to attach a furring 170 to the main body 110. In another exemplary aspect, optionally, furring attachment element 130 can be configured to slidably engage furring 170 to the main body 110. This slidable engagement can facilitate movement of the furring 170 relative to main body 110.

It should be noted that furring attachment element 130 is illustratively shown in FIG. 1 as tabs that can slidably engage furring 170; however any functionally compatible attachment structure or number of attachment structures for engagement can be provided. For example, furring attachment element 130 can optionally include one or more short or elongated tabs with at least one for the top and the bottom of the furring 170, respectively. FIG. 2 illustrates an exemplary embodiment of the present invention with furring attachment element 230 being a plurality of tabs.

Figure 3:
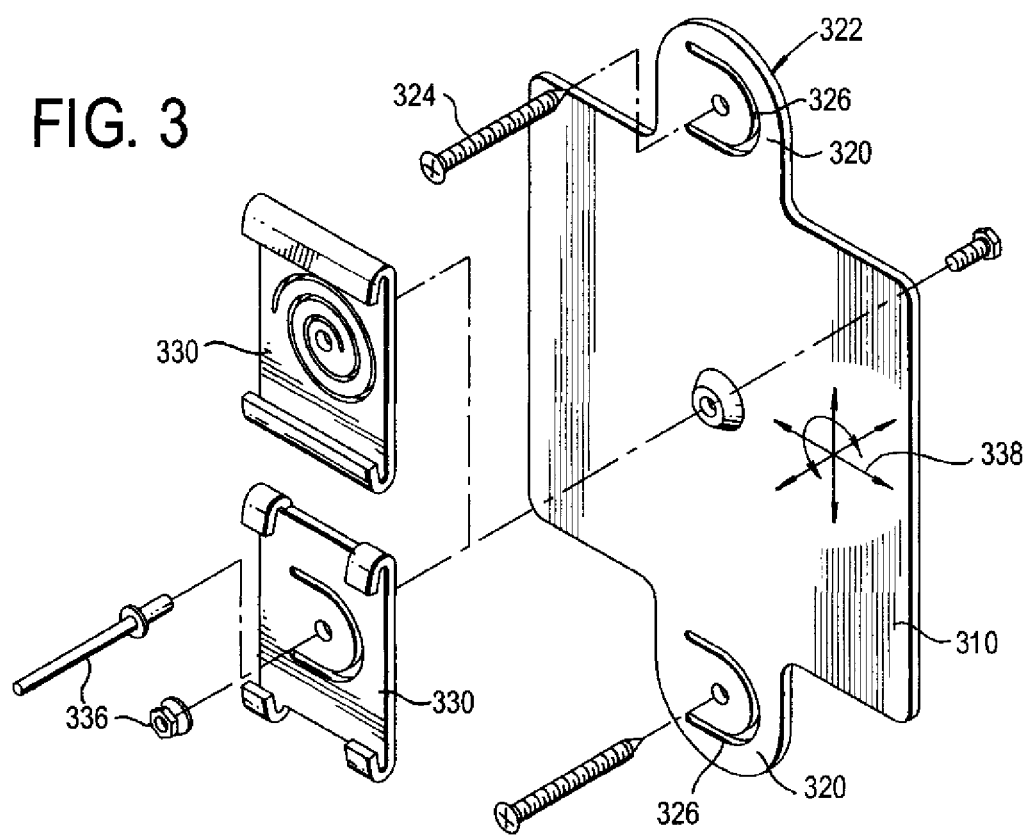
FIG. 3 illustrates an exemplary aspect of the present invention, in which an expansion bracket includes a furring attachment element which can be configured to attach to the main body via a main body attachment element.
Figure 4:
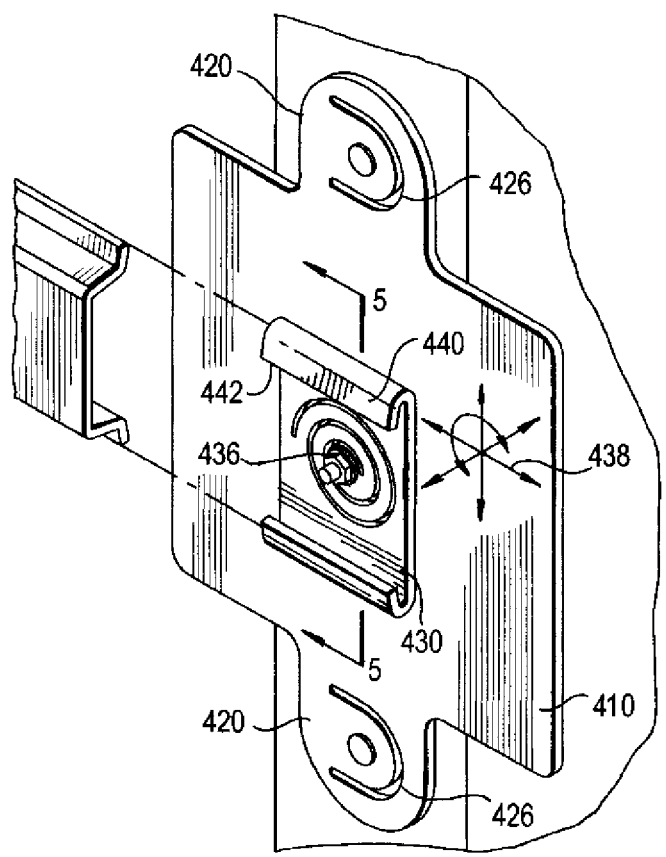
FIG. 4 illustrates an exemplary aspect of the present invention, in which an expansion bracket can include a furring attachment element rotatable around at least one axis.

It should further be noted that in FIG. 1, furring attachment element 130 is illustratively shown as being formed as part of the main body 110; however, as illustrated in FIGS. 3 and 4, furring attachment element 330, 430 can optionally be attached to the main body via a main body attachment element 336, 436, respectively. As illustrated shown in FIG. 3, furring attachment element 330 can optionally be one configuration or another configuration, however, one furring attachment element 330 can be attached to the main body 310 at a time.

FIG. 3 illustrates an additional exemplary aspect of the present invention, in which furring attachment element 330 can be attached to the main body 310 via a main body attachment element 336, with the furring attachment element being rotatable around at least one axis 338 and/or having a deformable flange (described in FIG. 4). Notably, furring attachment element 330 need not be provided with both of these aspects. The at least one axis 338 can be defined, at least in part, by the main body attachment element 336. In this exemplary embodiment, furring attachment element 330 can be configured to absorb, via rotation around the at least one axis 338, at least part of the movement of a wall stud due to the heat-based expansion of the wall stud. In particular, furring attachment element 330 can be configured to absorb, via rotational movement, when the main body 310 is attached to the wall stud and the furring attachment element 330, and the furring is attached to the furring attachment element 330 and a wall covering.

FIG. 4 illustrates another exemplary embodiment of the present invention, in which furring attachment element 430 is illustrated as being attached to the main body 410 via a main body attachment element 436. In a further exemplary aspect, furring attachment element 430 can have a furring attachment flange 440 formed of the same or different deformable material as the main body flange 420. As illustrated, furring attachment flange 440 can have a flange attachment end 442, and can be configured to attach to the main body 410 via main body attachment element 436. Notably, furring attachment element 430 can be configured to absorb, via deformation, at least a part of the movement 438 of the wall stud due to heat-based expansion of the wall stud. In particular, furring attachment element 430 can be configured to absorb such movement 438 when the main body 410 is attached to the furring attachment element 430 and a wall covering.

It should be noted that main body attachment elements 336, 436 as illustrated in FIGS. 3 and 4 can include, but are not limited to, one or more components that attach, or cooperatively attach, the furring attachment element 330, 430 to main body 310, 410, such as one or more of a screw, a nail, a screw or bolt with an optional complementarily shaped washer and/or nut, a rivet, a nail and a washer, one or more staples, or any other functionally compatible attachment element. FIG. 3 illustrates another exemplary aspect of the present invention, in which a main body flange 320 can be disposed at both the top and the bottom of the main body 310. It should be noted that in FIG. 3, main body flange 320 is illustratively shown as being two elements, however, any number of main body flanges 320 can be provided.

As illustratively shown in FIG. 3, wall stud attachment end 322 can be configured to attach to a wall stud, via a wall stud attachment element 324. It should be noted that wall stud attachment element 324 is illustratively shown as a screw; however any functionally compatible attachment element can be provided. For example and not in limitation, wall stud attachment element 324 can be one or more components that attach, or cooperatively attach, the wall stud attachment end 322 to wall stud 380, such as one or more of a screw, a nail, a screw or bolt with an optional complementarily shaped washer and/or nut, a rivet, a nail and a washer, one or more staples, or any other functionally compatible attachment element.

As also illustrated in FIG. 3, wall stud attachment end 322 can optionally include an expansion slot 326. Expansion slot 326 can be configured to pass through the main body 310, and at least a portion of expansion slot 326 can be adjacent to the main body flange 320. It should be noted that expansion slot 326 is illustratively shown in FIG. 3 as having at least a portion that is arced, however, any other functionally compatible shape can be provided. For example, at least a portion of expansion slot 326 can have a linear or spiral shape. It is expressly set forth that all possible shapes of expansion slot 326 include at least a portion having an arc or linear shape. It should also be noted that in embodiments with a plurality of wall stud attachment ends 322, any two wall stud attachment ends can have the same or differently shaped expansion slots.

Figure 5:
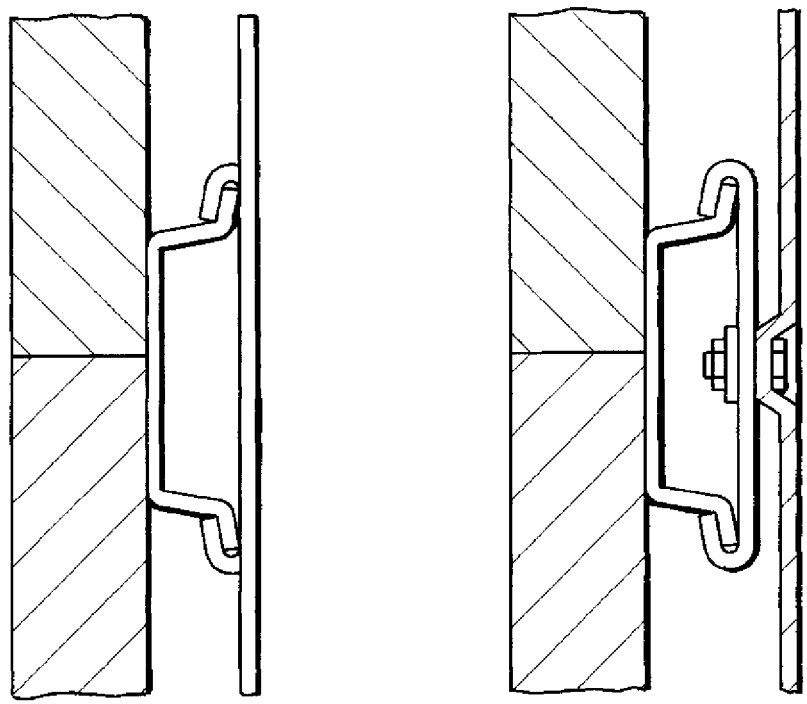
FIG. 5 illustrates an exemplary aspect of the present invention, in which cross-section views illustrate an expansion bracket attached between a wall stud and a wall covering.

FIG. 5 illustrates a cross section of the exemplary wall stud attachment configurations illustratively shown in FIGS. 1-4.

Figure 6:
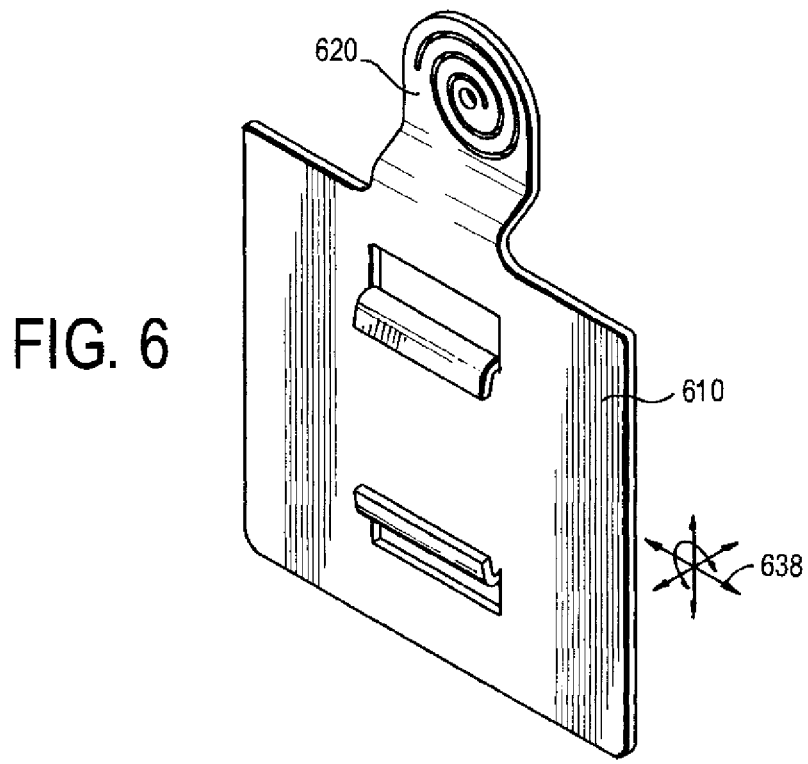
FIG. 6 illustrates an exemplary embodiment of the present invention, in which an expansion bracket can includes an offset main body flange.

FIG. 6 illustrates still another exemplary embodiment of the present invention, in which main body flange 620 can be offset from main body 610. It should be noted that the offset is illustrated in the z-direction 638; however, any functionally compatible offset, including direction, can be provided. Thus, the main body flange 620 can be offset in any direction relative to the stud.

Figure 7:
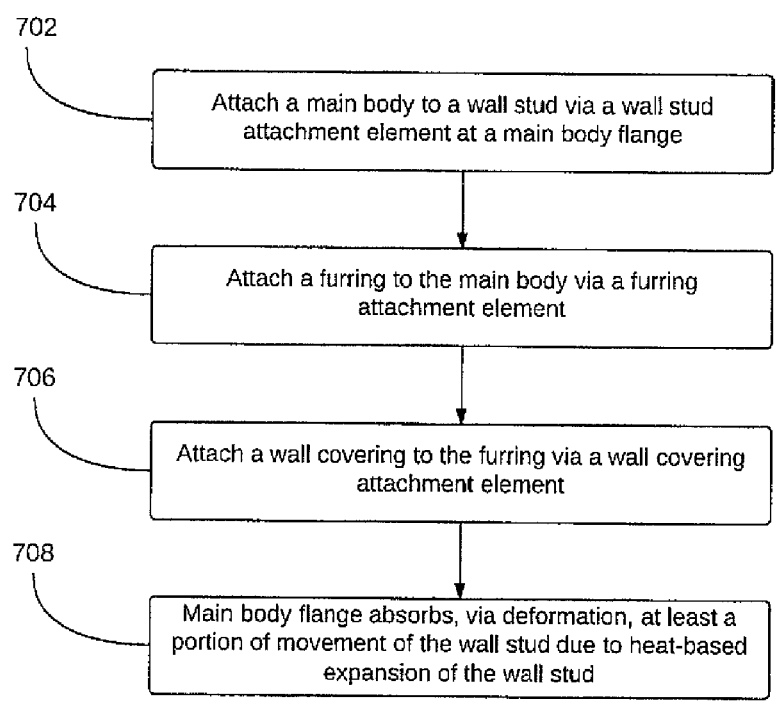
FIG. 7 illustrates an exemplary method of installing an expansion bracket for absorbing movement of a wall stud to prevent damage to a wall covering attached to the wall stud.

FIG. 7 illustrates an exemplary method of installing an expansion bracket according to the present invention. The following exemplary steps can be carried in any functionally compatible order: the main body can be attached to a wall stud (block 702); a furring can be attached to the main body (block 704); and a wall covering can be attached to the furring (block 706). The main body can be attached to the wall stud via a wall stud attachment element, as described herein. Further, a wall stud attachment element can pass through the main body to a wall stud at a wall stud attachment end, as described above.

At 704, the furring can be attached to the main body. As described above, attachment of the furring to the main body can occur through one of the embodiments of the furring attachment element, for example, a tab that is short or elongated, an aperture that is round, oval, square, or any other geometric, symmetric, asymmetric, regular or irregular shape, in whole or in part, etc.

The wall covering can be attached to the furring at 706, by a wall covering attachment element. Optionally, the wall covering attachment element can have one or more components that attach, or cooperatively attach, the wall covering to the furring, such as one or more of a screw, a nail, a screw or bolt with an optional complementarily shaped washer and/or nut, a rivet, a nail and a washer, one or more staples, or any other functionally compatible attachment element.

At 708 the main body flange can absorb at least some of the movement produced by heat-based expansion of the wall stud. Movement that can be absorbed includes, but is not limited to, deformational, rotational, linear, twisting, or any other movement.

Figure 8:
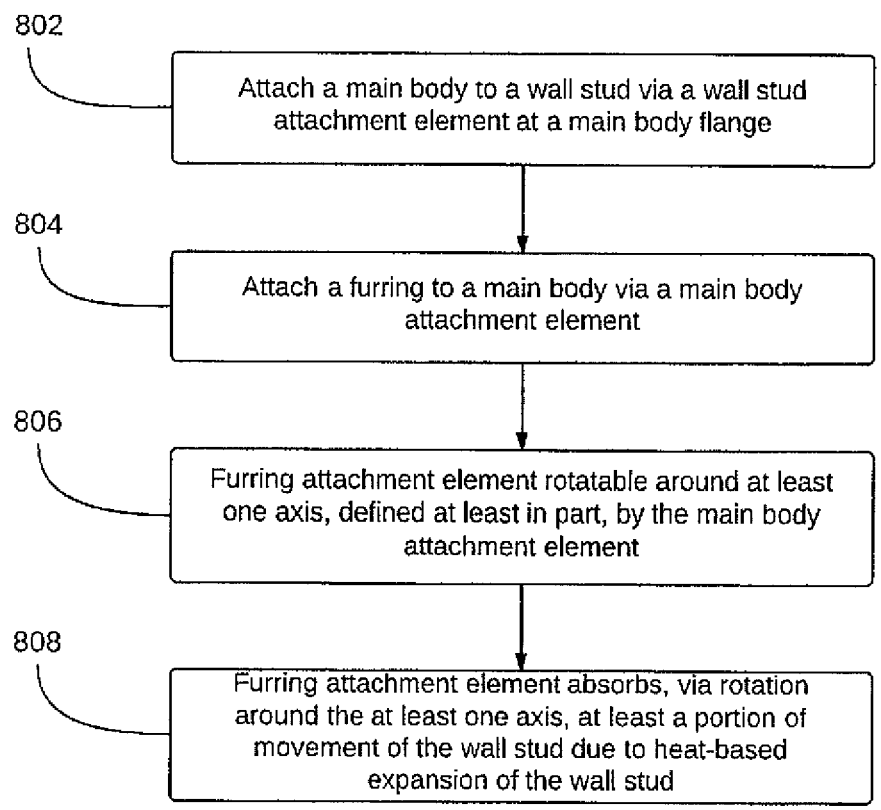
FIG. 8 illustrates an exemplary method of installing another embodiment of an expansion bracket.

FIG. 8 illustrates another exemplary method of installing an expansion bracket according to the present invention. The following exemplary steps can be carried in any functionally compatible order: a main body can be attached to a wall stud (block 802) and a furring can be attached to the main body via a main body attachment element (block 804). The main body can be attached to the wall stud via a wall stud attachment element, as described herein. Further, a wall stud attachment element can pass through the main body to a wall stud at a wall stud attachment end, as described above.

At 804, the furring can be attached to the main body, via a main body attachment element. The main body can include an expansion slot through the main body. Optionally, at least a portion of the expansion slot can be adjacent to a main body flange. As described above, the main body flange can have at least a portion that is arc or linear shaped. It is expressly set forth that all possible shapes of main body flange include at least a portion having an arc or linear shape, which can form any shape, including a spiral shape.

At 806, the furring attachment element can be configured to be rotatable around at least one axis, defined at least in part by the main body attachment element. The furring attachment element, as described above, can include a plurality of tabs configured to slidably attach the furring to the furring attachment element.

At 808, the furring attachment element can absorb, via rotation around at the least one axis, at least part of the movement produced by heat-based expansion of the wall stud. Movement that can be absorbed includes, but is not limited to, deformational, rotational, linear, twisting, or any other movement. The furring attachment element can be configured to absorb such movement when the main body is attached to the wall stud and the furring attachment element, and the furring is attached to the furring attachment element and the wall covering.

Figure 9:
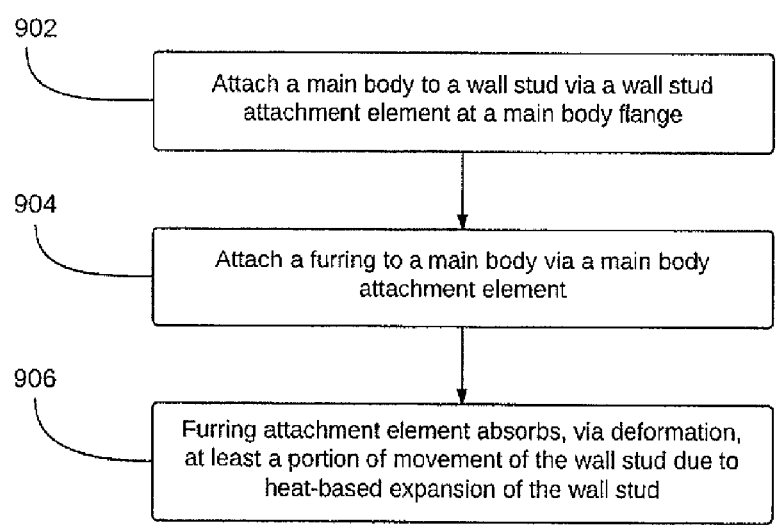
FIG. 9 illustrates an exemplary method of installing yet another embodiment of an expansion bracket.

FIG. 9 illustrates yet another exemplary method of installing an expansion bracket according to the present invention. The following exemplary steps can be carried in any functionally compatible order: a main body can be attached to a wall stud (block 902) and a furring can be attached to the main body via a main body attachment element (block 904). The main body can be attached to the wall stud via a wall stud attachment element, as described herein.

At 904, the furring can be attached to the main body, via a main body attachment element. The main body can include an expansion slot through the main body. Optionally, at least a portion of the expansion slot can be adjacent to a main body flange. As described above, the main body flange can have at least a portion that is arc or linear shaped. It is expressly set forth that all possible shapes of main body flange include at least a portion having an arc or linear shape, which can form any shape, including a spiral shape.

At 906, the furring attachment element can absorb, via deformation, at least part of the movement produced by heat-based expansion of the wall stud. Movement that can be absorbed includes, but is not limited to, deformational, rotational, linear, twisting, or any other movement. The furring attachment element can be configured to absorb such movement when the main body is attached to the wall stud and the furring attachment element, and the furring is attached to the furring attachment element and the wall covering. The furring attachment element, optionally, can include a plurality of tabs configured to slidably attach the furring to the furring attachment element.

Also at 906, the furring attachment element can have a furring attachment flange formed of a deformable or another deformable material. The furring attachment flange can have at least a portion that is arc or linear-shaped. It is expressly set forth that all possible shapes of the furring attachment flange include at least a portion having an arc or linear shape, which can form any shape, including a spiral shape. The furring attachment element can also have a flange attachment end, which can be configured to attach to the via the main body attachment element.

It will be apparent to one of ordinary skill in the art that the manner of making and using the claimed invention has been adequately disclosed in the above-written description of the exemplary embodiments and aspects. It should be understood, however, that the invention is not necessarily limited to the specific embodiments, aspects, arrangement and components shown and described above, but may be susceptible to numerous variations within the scope of the invention. Moreover, particular exemplary features described herein in conjunction with specific embodiments and/or aspects of the present invention are to be construed as applicable to any embodiment described within, enabled thereby, or apparent herefrom. Thus, the specification and drawings are to be regarded in a broad, illustrative, and enabling sense, rather than a restrictive one.

Further, it will be understood that the above description of the embodiments of the present invention are susceptible to various modifications, changes, and adaptations, and the same are intended to be comprehended within the meaning and range of equivalents of the appended claims.

Therefore I claim:

1. An expansion bracket-wall stud system, said system comprising:
    a wall stud; and
    an expansion bracket, said bracket comprising a main body having first and second main body flanges, formed of one or more deformable materials, and having respective wall stud attachment ends attached to said wall stud via respective wall stud attachment elements, the main body further having a furring attachment element configured to attach a furring to the main body;
    wherein when the main body is attached between said wall stud and the furring with both the first and second flanges attached to said wall stud, and the wall covering is attached to the furring via a wall covering attachment element, the first and second flanges are configured to absorb, via deformation, at least a portion of movement of said wall stud due to heat-based expansion of said wall stud.

2. The system of claim 1, wherein the main body includes an expansion slot through the main body, and at least a portion of the expansion slot is adjacent to at least one of the first and second main body flanges.

3. The system of claim 1, wherein at least a portion of at least one of the first and second main body flanges includes at least one of an arc shape, a linear shape, and a spiral shape.

4. The system of claim 1, wherein the furring attachment element includes a plurality of tabs configured to attach the furring to the main body.

5. A system comprises an expansion bracket, said expansion bracket comprising:
    a main body having a main body flange, formed of a deformable material, and having a wall stud attachment end configured to attach to the wall stud via a wall stud attachment element, said main body further having a furring attachment element configured to attach a furring to said main body;
    wherein when said main body is attached to the wall stud and the furring, and the wall covering is attached to the furring via a wall covering attachment element, the main body flange is configured to absorb, via deformation, at least a portion of the movement of the wall stud due to a heat-based expansion of the wall stud, and
    wherein the furring attachment element is configured to attach to said main body via a main body attachment element, with the furring attachment element being rotatable around at least one axis defined at least in part by the main body attachment element, and when said main body is attached to the wall stud and the furring attachment element, and the furring is attached to the furring attachment element and the wall covering, the furring attachment element is configured to absorb, via rotation around the at least one axis, at least a part of the movement of the wall stud due to the heat-based expansion of the wall stud.

6. The system of claim 5 wherein said main body includes an expansion slot through said main body, and at least a portion of the expansion slot is adjacent to the main body flange.

7. The system of claim 5, wherein at least a portion of the main body flange includes at least one of an arc shape, a linear shape, and a spiral shape.

8. The system of claim 5, wherein the furring attachment element includes a plurality of tabs configured to attach the furring to the furring attachment element.

9. A system comprises an expansion bracket, said expansion bracket comprising:
    a main body having a main body flange, formed of a deformable material, and having a wall stud attachment end configured to attach to the wall stud via a wall stud attachment element, said main body further having a furring attachment element configured to attach a furring to said main body;
    wherein when said main body is attached to the wall stud and the furring, and the wall covering is attached to the furring via a wall covering attachment element, the main body flange is configured to absorb, via deformation, at least a portion of the movement of the wall stud due to a heat-based expansion of the wall stud, and
    wherein the furring attachment element is configured to attach to said main body via a main body attachment element, with the furring attachment element having a furring attachment flange, formed of one of the deformable material and another deformable material, and having a flange attachment end configured to attach to said main body via the main body attachment element, and when said main body is attached to the wall stud and the furring attachment element, and the furring is attached to the furring attachment element and the wall covering, the furring attachment element is configured to absorb, via deformation, at least a part of the movement of the wall stud due to the heat-based expansion of the wall stud.

10. The system of claim 9, wherein said main body includes an expansion slot through said main body, and at least a portion of the expansion slot is adjacent to the main body flange.

11. The system of claim 9, wherein at least a portion of the furring attachment flange includes at least one of an arc shape, a linear shape, and a spiral shape.

12. The system of claim 9, wherein the furring attachment element includes a plurality of tabs configured to attach the furring to the furring attachment element.

13. The system of claim 9, wherein at least a portion of the main body flange includes at least one of an arc shape, a linear shape, and a spiral shape.

14. The system of claim 13, wherein at least a portion of the furring attachment flange includes at least one of an arc shape, a linear shape, and a spiral shape.

15. A method of installing an expansion bracket for absorbing movement of a wall stud to prevent damage to a wall covering attached to the wall stud, said method comprising:
attaching a main body of the expansion bracket to the wall stud;
attaching a furring to the main body; and
attaching the wall covering to the furring;
wherein the main body includes first and second main body flanges, formed of one or more deformable materials, and respective wall stud attachment ends configured to attach to the wall stud via respective wall stud attachment elements, the main body further including a furring attachment element configured to attach a furring to the main body, and when the main body is attached between the wall stud and the furring with both the first and second flanges attached to the wall stud, and the wall covering is attached to the furring, the first and second main body flanges are configured to absorb, via deformation, at least a portion of the movement of the wall stud due to a heat-based expansion of the wall stud.

16. The method of claim 15, wherein the main body includes an expansion slot through the main body, and at least a portion of the expansion slot is adjacent to at least one of the first and second main body flanges.

17. The method of claim 15, wherein at least a portion of at least one of the first and second main body flanges includes at least one of an arc shape, a linear shape, and a spiral shape.

18. The method of claim 15, wherein the furring attachment element includes a plurality of tabs configured to attach the furring to the main body.

19. A method of installing an expansion bracket for absorbing movement of a wall stud to prevent damage to a wall covering attached to the wall stud, said method comprising:
attaching a main body of the expansion bracket to the wall stud;
attaching a furring to the main body; and
attaching the wall covering to the furring;
wherein the main body has a main body flange, formed of a deformable material, and has a wall stud attachment end configured to attach to the wall stud via wall stud attachment element, said main body further has a furring attachment element configured to attach a furring to said main body, and when the main body is attached to the wall stud and the furring, and the wall covering is attached to the furring, the main body flange is configured to absorb, via deformation, at least a portion of the movement of the wall stud due to a heat-based expansion of the wall stud, and
wherein attaching a furring to the main body includes attaching the furring to the main body via a main body attachment element, with the furring attachment element being rotatable around at least one axis defined at least in part by the main body attachment element, and when the main body is attached to the wall stud and the furring attachment element, and the furring is attached to the furring attachment element and the wall covering, the furring attachment element is configured to absorb, via rotation around the at least one axis, at least a part of the movement of the wall stud due to the heat-based expansion of the wall stud.

20. The method of claim 19, wherein the main body includes an expansion slot through the main body, and at least a portion of the expansion slot is adjacent to the main body flange.

21. The method of claim 19, wherein at least a portion of the main body flange includes at least one of an arc shape, a linear shape, and a spiral shape.

22. The method of claim 19, wherein the furring attachment element includes a plurality of tabs configured to attach the furring to the furring attachment element.

23. A method of installing an expansion bracket for absorbing movement of a wall stud to prevent damage to a wall covering attached to the wall stud, said method comprising:
attaching a main body of the expansion bracket to the wall stud;
attaching a furring to the main body; and
attaching the wall covering to the furring;
wherein the main body has a main body flange, formed of a deformable material, and has a wall stud attachment end configured to attach to the wall stud a via wall stud attachment element, said main body further has a furring attachment element configured to attach a furring to said main body, and when the main body is attached to the wall stud and the furring, and the wall covering is attached to the furring, the main body flange is configured to absorb, via deformation, at least a portion of the movement of the wall stud due to a heat-based expansion of the wall stud, and
wherein attaching a furring to the main body includes attaching the furring to the main body via a main body attachment element, with the furring attachment element having a furring attachment flange, formed of one of the deformable material and another deformable material, and having a flange attachment end configured to attach to the main body via the main body attachment element, and when the main body is attached to the wall stud and the furring attachment element, and the furring is attached to the furring attachment element and the wall covering, the furring attachment element is configured to absorb, via deformation, at least a part of the movement of the wall stud due to the heat-based expansion of the wall stud.

24. The method of claim 23 wherein the main body includes an expansion slot through the main body, and at least a portion of the expansion slot is adjacent to the main body flange.

25. The method of claim 23, wherein at least a portion of the furring attachment flange includes at least one of an arc shape, a linear shape, and a spiral shape.

26. The method of claim 23, wherein the furring attachment element includes a plurality of tabs configured to attach the furring to the furring attachment element.

27. The method of claim 23, wherein at least a portion of the main body flange includes at least one of an arc shape, a linear shape, and a spiral shape.

28. The method of claim 27, wherein at least a portion of the furring attachment flange includes at least one of an arc shape, a linear shape, and a spiral shape.

* * * * *